US006753913B1

(12) United States Patent
Bilhan et al.

(10) Patent No.: US 6,753,913 B1
(45) Date of Patent: Jun. 22, 2004

(54) CMOS ANALOG FRONT END ARCHITECTURE WITH VARIABLE GAIN FOR DIGITAL CAMERAS AND CAMCORDERS

(75) Inventors: Haydar Bilhan, Dallas, TX (US); Gary E. Lee, Plano, TX (US); Ramesh Chandrasekaran, Dallas, TX (US); Feng Ying, Plano, TX (US); Ching-Yuh Tsay, Plano, TX (US); Xucheng Wang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 835 days.

(21) Appl. No.: 09/654,192

(22) Filed: Sep. 1, 2000

Related U.S. Application Data

(60) Provisional application No. 60/152,436, filed on Sep. 3, 1999.

(51) Int. Cl.[7] .............................................. H04N 5/217
(52) U.S. Cl. ...................................... 348/241; 348/243
(58) Field of Search ................................ 348/241, 243, 348/245, 247, 242, 250

(56) References Cited

U.S. PATENT DOCUMENTS

| | | | |
|---|---|---|---|
| 5,548,331 A | * 8/1996 | Kawahara et al. .......... 348/243 |
| 5,877,715 A | 3/1999 | Gowda et al. |
| 5,880,618 A | 3/1999 | Koen |
| 5,892,540 A | 4/1999 | Kozlowski et al. |
| 5,995,163 A | * 11/1999 | Fossum ...................... 348/571 |
| 6,018,364 A | * 1/2000 | Mangelsdorf ............... 348/241 |
| 6,084,634 A | * 7/2000 | Inagaki et al. .............. 348/243 |
| 6,587,144 B1 | * 7/2003 | Kim ........................... 348/241 |

OTHER PUBLICATIONS

K.H. Chen, A BiCMOS Signal Prcessor For B/W CCD Camera, 1993, VLSI Technology, Systems, and Applications Symposium, pp. 272–276.*
An Analog–to–Digital Processor for Camcorders and Digital Still Cameras; Mike Koen; 1998 IEEE; pp. 570–580.
Single Chip CCD Signal Processor for Digital Cameras; Roger Levinson; Cavit Ozdalga; Jul. 1997.
CCD Signal Processor for Electronic Cameras; Analog Devices Inc.; pp. 1–12.
SpeedPlus CCD Signal Processor for Digital Cameras; Burr–Brown Corporation; pp. 1–12.

(List continued on next page.)

Primary Examiner—Wendy R. Garber
Assistant Examiner—Matthew L. Rosendale
(74) Attorney, Agent, or Firm—April M. Mosby; Wade James Brady, III; Frederick J. Telecky, Jr.

(57) ABSTRACT

An image processing apparatus for charge coupled device (CCD) and video inputs in a digital camera or for a digital camcorder is disclosed which provides optical black and offset correction for CCD inputs. A sampling circuit, including correlated double sampler (CDS) (402) and programmable gain amplifier (450), samples the image input signal and the video input signal. CDS (402) includes a single-ended amplifier (404) and a differential amplifier (406). The single-ended amplifier (404) functions such that it is only operable during an CCD signal input; otherwise, the single-ended amplifier (404) is bypassed such that a video signal is only sampled by the differential amplifier (406). For CCD signals, the single-ended amplifier (404) samples the reference level of the pixel and holds it during the video interval. The differential amplifier (404) samples both the output of the single ended amplifier (404) and the video level of the same pixel. Overall, the CDS (402) subtracts these levels and converts the difference to a differential output to improve signal to noise performance and dynamic range. An analog-to-digital converter (210) converts the sampled signal and feeds this digital sample to a digital correction circuit (212–238) where optical black level, hot and cold pixels, and line noise are removed.

10 Claims, 6 Drawing Sheets

OTHER PUBLICATIONS 3V, 10–Bit 30 MSPS, Area CCD and Video Signal Processor; Texas Instruments; pp. 0–18.

TA 11.6; A CMOS Analog Front–End Chip–Set for Mega Pixel Camcorders; 2000 IEEE International Solid–State Circuits Conference.

A 10 Bit 30 MSample/s 150mW CMOS Analog Front End with 0–36dB Gain for Digital Cameras and Camcorders; Haydar Bilhan et al.

* cited by examiner

CMOS ANALOG FRONT END ARCHITECTURE WITH VARIABLE GAIN FOR DIGITAL CAMERAS AND CAMCORDERS

CROSS-REFERENCE TO RELATED APPLICATION

The present invention relates to a copending applications entitled "Optical Black and Offset Correction in CCD Signal Processing," Ser. No. 09/353,919, filed on Jul. 15, 1999, "A Capacitor Based Exponential Programmable Gain Amplifier," Ser. No. 09/354,461, filed on Jul. 15, 1999, and "A Digital Scheme for Noise Filtering of Optical Black and Offset Correction in CCD Signal Processing," application Ser. No. 60/152,439, filed on Sep. 3, 1999, which are incorporated by reference herein. This application claims priority under 35 USC § 119(e)(1) of provisional application No. 60/152,436, filed Sep. 3, 1999.

FIELD OF THE INVENTION

The present invention relates to image processing and, more particularly, to an analog front end circuit which provides digital optical black and offset correction for CCD inputs and enables the use of the same channel for both CCD and video signal inputs.

BACKGROUND OF THE INVENTION

Advances in integrated circuit design and manufacturing have enabled low cost, highly integrated, high performance image processing products, including the digital electronic cameras and camcorders. A conventional camera comprises an image sensor, typically an array charge coupled device (CCD), an analog front end (AFE) and a digital image processor. A CCD is a two-dimensional array of sensors each of which produces a charge as a function of the quantity of photons it absorbs. After an image is exposed on a CCD, the pixels are shifted vertically to a line charge register and this line shifts the pixels horizontally to the output. Most CCDs have an on-chip amplifier, usually a source follower, which converts the charge to a voltage output.

Most analog front end circuits having optical black and offset calibration include schemes that integrate the error signal on a capacitor during an optical black period and feed back the voltage generated to the input to cancel the offset or the optical black value during the image interval.

As is known, analog image signals output from image processing devices may be supplied to a feedback clamp circuit prior to being processed in various manners including, for example, linear mask processing, gamma correction, and knee correction, in order to produce a video signal. Our copending application, Ser. No. 09/353,919, as shown in FIG. 1, provides a CCD signal processing method that provides optical black offset correction using a moving average filter scheme such that the optical black pixels are averaged at the beginning of each line and offset DACs, 114 and 116, are updated in order to cancel the offset. Specifically, this embodiment provides a digital technique that corrects the offset and optical black value in the analog domain using a coarse and fine adjustment mode. Digital optical black correction circuit 100 determines the necessary amount that the analog image signal should be adjusted. DACs, 114 and 116, provide offsets in the coarse and fine adjustment modes, respectively. This highly programmable design 100 can be used both in discrete and continuous time systems and does not require any off-chip components.

The analog front end (AFE) 100 converts the CCD (not shown) output signal to digital data to allow subsequent digital signal processing. At the input of the AFE 100, the DC level of the CCD output signal is clamped to the input dynamic range. For better noise performance and dynamic range, correlated double sampling is applied to the clamped input signal. The output of correlated double sampler (CDS) 102 is amplified by a programmable gain amplifier 106 that varies exponentially with linear control. Then the amplified analog signal is converted to digital data. The optical black value and channel offset are corrected in order to maximize the dynamic range.

In operation, CCD image lines are shifted vertically to a line register, then the pixels on this line are shifted horizontally to an output pin. This embodiment cancels the optical black level experienced by the image signal. However, line noise may exist in the optical black correction. Even when correction DAC updates are averaged over a fixed number of user programmable lines, there may be visible bands on the image. Moreover, the average differs from line to line since some of the optical black pixels may be defective, i.e. hot and cold optical black pixels. A hot pixel is a defective pixel that generates too much charge, and a cold pixel is the one that does not generate any charge.

Our copending application Ser. No. 60/152,439, as shown in FIGS. 2 and 3, discloses a moving average filter scheme for CCD optical black correction that removes this line noise along with the hot and cold pixels without creating bands on the image. It has a straightforward moving average filter, including a simplified version, that can be used in order to save a significant amount of registers and complex digital circuits. Yet, this design is still lacking in that it only operates to receive image signals in the CCD mode.

There, however, exist a need for processing video input signals in many applications, along with the ability to process CCD signals; hence, there exists a need to operate in both a CCD mode and a video mode.

SUMMARY OF THE INVENTION

To address the above-discussed deficiencies of the moving average filter scheme for CCD optical black correction, the present invention teaches an analog front-end circuit that has two modes of operation: a first mode for CCD image signals and a second mode for video image signals. This analog front end circuit, including a sampling circuit and an analog-to-digital converter, is operable to sample, amplify, and convert the analog image signal to a digital image signal.

A sampling circuit samples the CCD input signal or the video input signal using a correlated double sampler (CDS), comprising a single-ended amplifier and a differential amplifier, coupled to a programmable gain amplifier (PGA). The single-ended amplifier functions such that it is only operable during an CCD signal input; otherwise, the single-ended amplifier is bypassed such that a video signal is only sampled by the differential amplifier. The single-ended amplifier samples the reference level of the pixel and holds it during the video interval. The differential amplifier samples both the output of the single ended amplifier and the video level of the same pixel. Overall, the CDS subtracts these levels and converts the difference to a differential output to improve signal to noise performance and dynamic range. An analog-to-digital converter converts the sampled signal and feeds this digital sample to a digital correction circuit which corrects the optical black level and removes hot and cold pixels and line noise.

Albeit, a digital error correction circuit connects to the analog front-end circuit to remove the optical black pixel level from the image signal such that the sum of the channel offset and optical black level is averaged for a given number of lines and optical black cells per line, and the channel is digitally calibrated to obtain a user programmed ADC output which corresponds to that average.

In a second embodiment, the error correction circuit removes hot and cold pixels, as well as filters line noise. Moreover, a digital filter is employed to obtain noise-free optical black correction with digitally programmable bandwidth.

Advantages of this design include but are not limited to an image processing apparatus operable in a CCD mode and video mode. This circuit has an improved dynamic range for image processing over other approaches. As such, this highly programmable design can be used both in discrete and continuous time systems and does not require any off-chip components. Thus, this design meets the goal of extracting as much analog dynamic range from the image sensor without adding any noise with subsequent circuitry.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENTS

Figure 1:
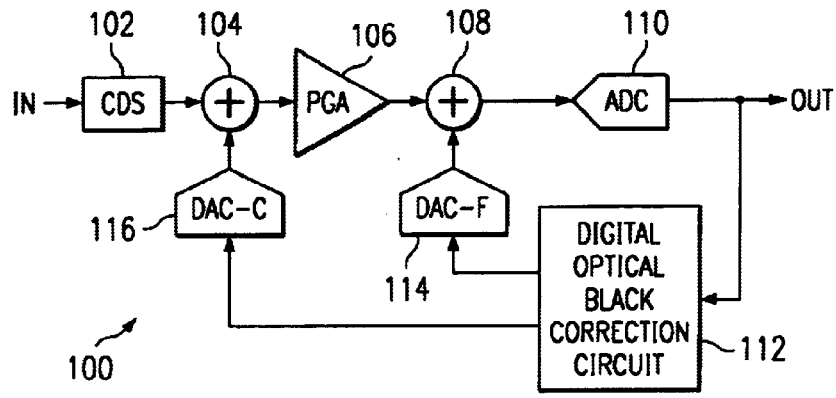
FIG. 1 is a block diagram of the optical black offset correction apparatus as disclosed in the co-pending application, Ser. No. 09/353,919.
Figure 2:
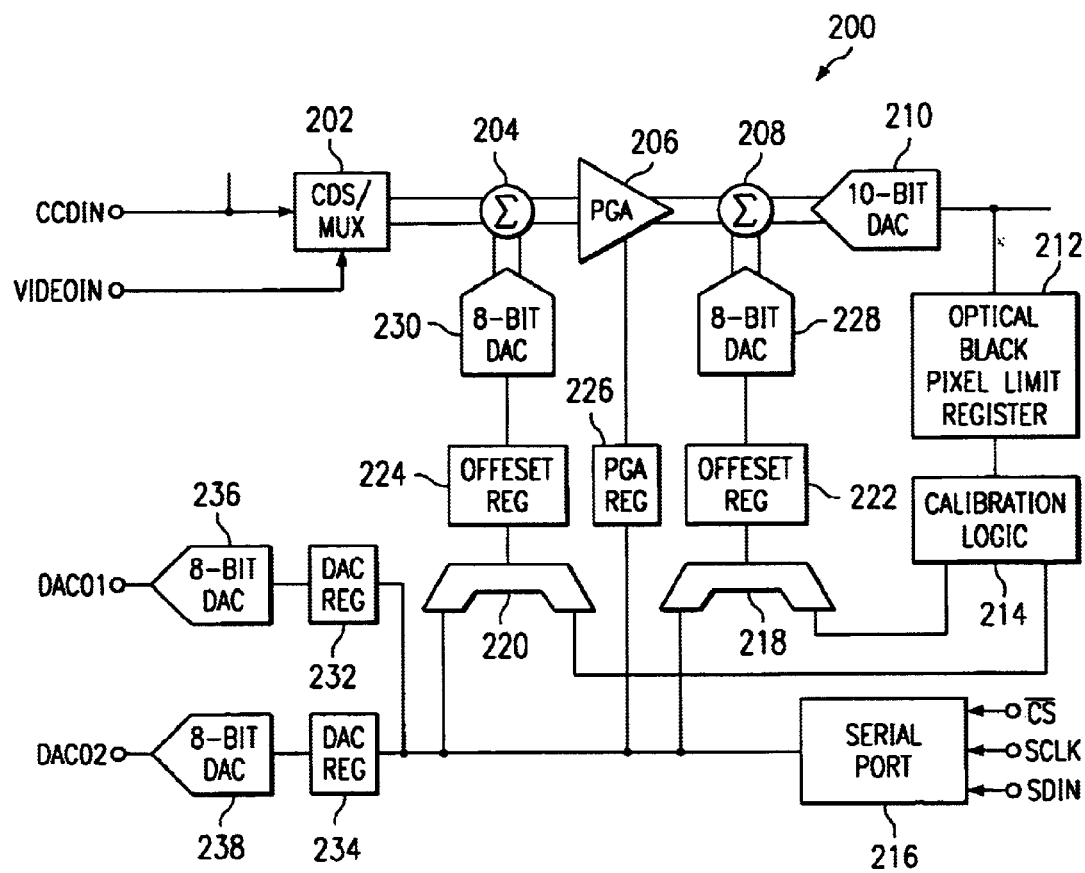
FIG. 2 illustrates an architecture for providing optical black and offset calibration and removing noise in accordance with the present invention.
Figure 3:
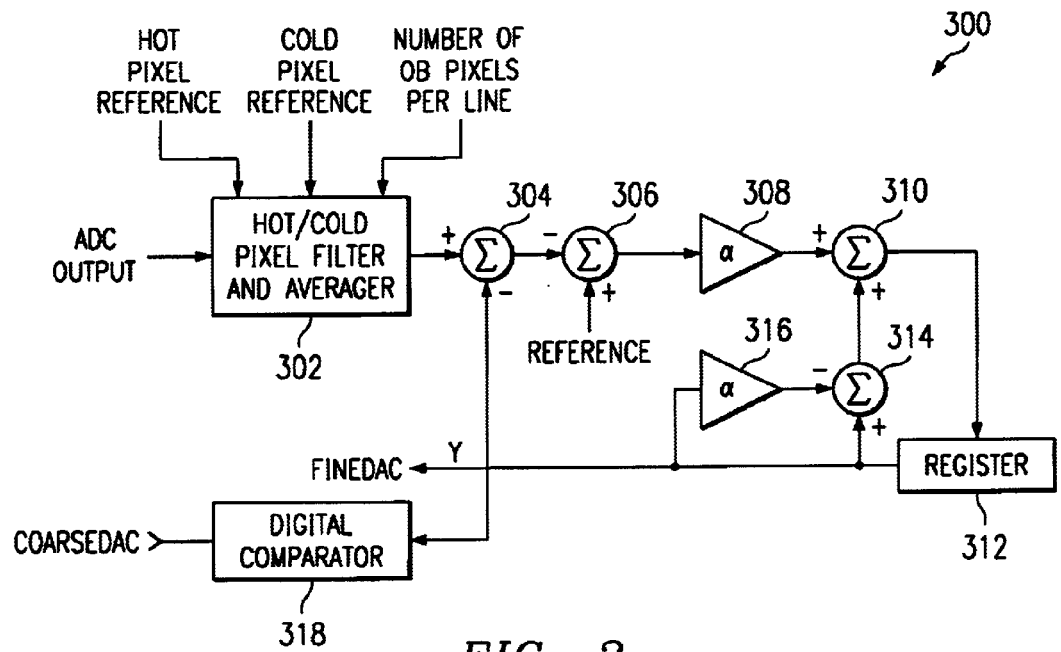
FIG. 3 illustrates the calibration logic for providing optical black and offset calibration and removing noise in accordance with the present invention.

In accordance with the present invention, an image processing apparatus as illustrated in FIGS. 2–5 is capable of obtaining a noise-free optical black and offset correction that allows use of the same channel for both CCD and video signal inputs. Accordingly, the invention is discussed with reference to all four FIGS. 2–5. FIG. 2 discloses an image processing apparatus or analog front-end (AFE) circuit 200 that includes a sampling circuit for sampling the incoming image signal. The sampling circuit includes a correlated double sampler (CDS) 202, programmable gain amplifier (PGA) 206, and an analog-to-digital converter (ADC) 210. A detecting circuit 212 detects the optical black level. In addition, the detecting circuit 212 includes a first filter for filtering hot and cold pixels prior to averaging the optical black pixels. Calibration logic 214 incorporates the circuit 300, shown in FIG. 3. Circuit 300 includes a digital averager 302 that averages the optical black pixels at the beginning of each line of the image signal. A line noise filter, implemented with elements 304–316, receives the averaged optical black signal and, further, removes line noise from the optical black signal. A digital comparator 318 receives a reference signal and the optical black signal to compare the optical black signal with the reference signal. The difference is received by the calibration logic 214 for correcting the optical black level by feeding back the difference obtained by the digital comparator 318 such that the difference is applied to the analog image signal through DACs, 228 and 230. DACs, 228 and 230, provides a coarse and fine adjustment to the analog image signal, respectively.

Figure 4:
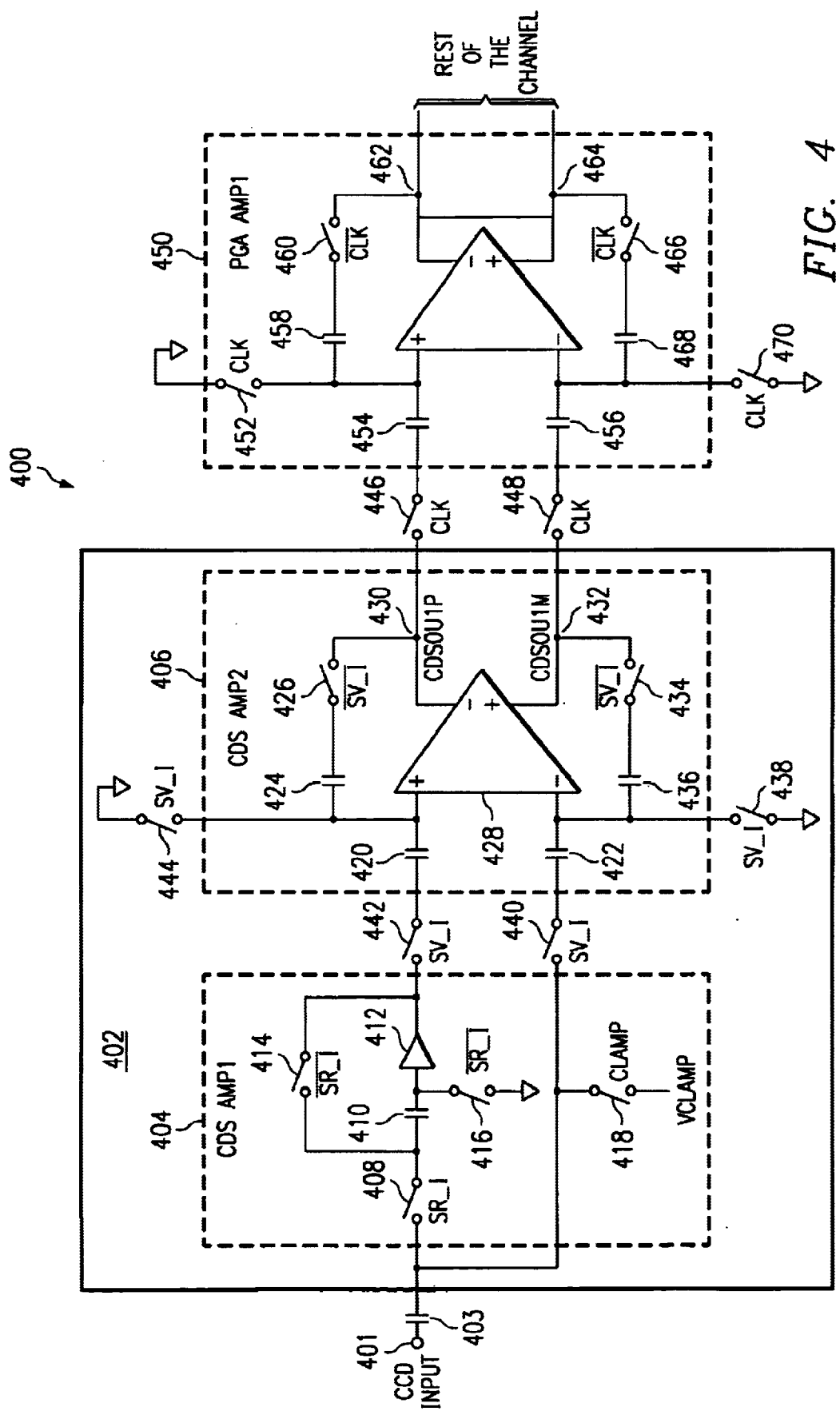
FIG. 4 displays an image apparatus operable in a CCD mode in accordance with the present invention.

FIG. 4 shows a portion 400 of an analog front end (AFE) having optical black and offset correction wherein the analog front end (AFE) converts the CCD output signal to digital data to allow subsequent digital signal processing. The configuration shown in FIG. 4 exemplifies the CCD mode of the image processing device in accordance with the present invention. As shown, at the input 401 of the AFE, the DC level of the CCD output signal is clamped to the input dynamic range by capacitor 403. For better noise performance and dynamic range, correlated double sampler (CDS) 402 applies correlated double sampling to the clamped input signal. The output of CDS 402 is amplified by a programmable gain amplifier (PGA) 450 that varies exponentially with linear control. The analog-to-digital converter (ADC) 210 converts the analog signal to digital data. The optical black value and channel offset are corrected in order to maximize the dynamic range as discussed above.

Figure 6:
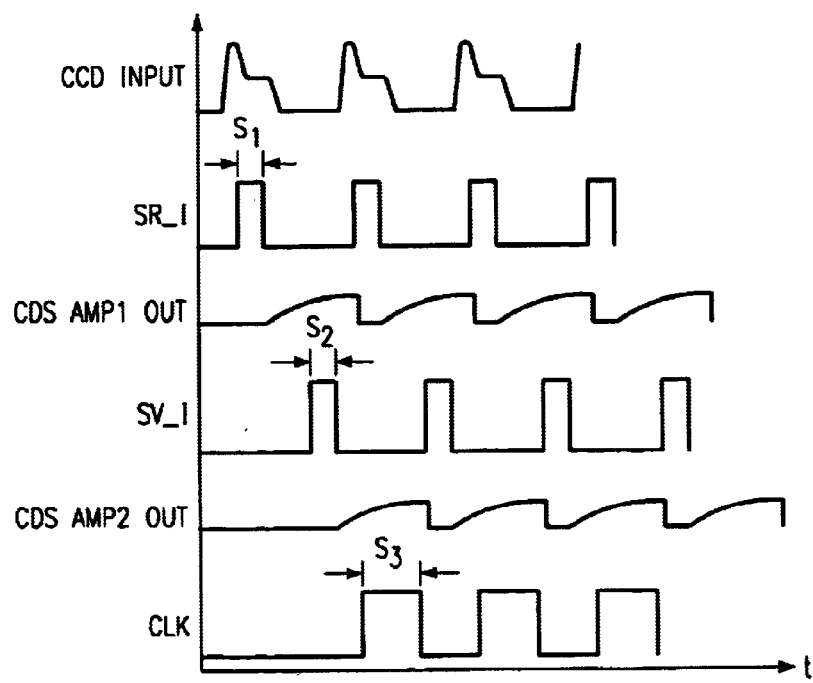
FIG. 6 is a timing diagram for the signals of the image apparatus operable in CCD mode in accordance with the present invention.

During CCD mode, two clock signals (SR_I, SV_I) are used for CDS 402 and one clock signal (CLK) is used for ADC 210 and PGA 450 timing. Noting the timing diagram shown in FIG. 6, during the $\delta_1$ interval, single-ended amplifier 404 samples the CCD reference signal. During $\delta_2$ interval, differential amplifier 406 samples the video signal and the output from single-ended amplifier 404. Finally, during interval $\delta_3$. CDS 402 subtracts these levels and converts them to a differential output to improve signal to noise performance and dynamic range. PGA 450 samples the output of differential amplifier 406. Since the DC level of the CCD input 401 is typically larger than 8V which exceeds the input dynamic range of CDS 402, the CCD input 401 is capacitively coupled to the CDS 402 using capacitor 403. The CCD input 401 is also clamped to establish the proper DC level.

As described, the output of CDS 402 is amplified by a programmable gain amplifier 450 that varies exponentially with linear control. The PGA disclosed within our copending application, Ser. No. 09/354,461, is suitable for this implementation, which is incorporated by reference herein. The PGA disclosed uses only CMOS components to achieve an exponential gain characteristic with linear control signals. The exponential gain characteristic is implemented with the approximate function of $G(X)=(1+X)/(1-X)$. An alternative embodiment uses a known switching scheme implements G(X)=1+2*X/(1−X) with fewer components and reduced bandwidth requirements on an operational amplifier. By using unit capacitors to implement the function, gain control relies on capacitor matching to a large degree. Both positive and negative gain (attenuation) functions are feasible using suitable capacitor configurations. The use of capacitors makes the layout compact, and its inherent hold function makes it easy to "pipeline" several stages together for larger overall gain range without severe performance requirement on the operational amplifiers.

One embodiment of PGA 450 provides an exponential gain variation from 0 to 36 dB, which translates to a gain within the range from 1 to 64. CDS 402 provides gains of 0 or 6 dB, and each of the two coarse gain stages (not shown) in the PGA 450 provides gains of 0,6, 12 dB. A fine gain stage provides a gain of 0 to 6 dB in 64 steps, with 0.09 dB increments. Thus, there are 6 ranges of 64 steps each, a total of 384 steps to span the 36 dB gain range. All the three stages in PGA 450 are switched capacitor stages. To implement the exponential gain variation in the fine gain stage the approximation of:

$$\ln((a+x)/(a-x)) = \sim 2x/a \quad |x| < a \qquad (1)$$

is utilized; where x is the linear gain control code and a is the constant that determines the number of gain steps. The switched capacitor stage implements the gain (a+x)/(a−x). Since (a+x)=(a−x)+2x, the feedback capacitor which also samples the input is (a−x) and the sampling capacitor is 2x.

The pipelined ADC 210 has three stages (not shown) each having a 4-bit flash ADC. Digital error correction is used such that the comparator 318 accuracy requirement is 4-bits instead of 10. The choice of the stage resolution is based on power consumption considerations. The major power consumption in ADC 210 is due to the operational amplifiers. It is preferable to use as few operational amplifiers as possible. However, more bits per stage will require higher gain of the residue amplifier hence an op-amp with higher open loop gain and bandwidth. For the 4 bits-per-stage architecture, two stage operational amplifiers with 90 dB gain, and 800 Mhz bandwidth are used. Typical power consumption of ADC is 40 mW at 30M samples and 3V.

As is known, CCD sensor (not shown) will produce an output even when it is not exposed to any light. This output is known as the optical black level (OBL). In order to increase the dynamic range, the OBL and channel offset are canceled in the analog domain. The black pixels are averaged at the beginning of each line and two DACs, 230 and 228, one before and after the PGA 450, are updated to achieve the desired optical level. The optical black levels, however, for each line can be noisy, which may cause line noise on the image. A digital scheme, utilizing programmable filter parameters, is used to reject the high frequency optical black level noise and still correct the slow moving offset. A moving average filter 302 is approximated with a simplified function that only requires a few registers:

$$Y(n) = w^*X(n) + (1-w)^*Y(n-1) \qquad (2)$$

where Y(n) is the new DAC value, X(n) is the error signal (the difference between the desired optical black level value and actual OBL average when correction DAC is set to zero), and Y(n−1) is the previous DAC value, w is the user programmable weight. If w is 1, the correction is fast but high frequency line noise is not filtered out. If w is small, correction is slower but line noise is filtered out. The cut-off frequency of the optical black level low pass filter can be digitally programmed depending on the trade off between the correction response time and high frequency components due to defective optical black pixels and noise of the CCD.

The AFE may be fabricated in a 0.6 u CMOS process. The measurement results are shown in the table below:

| | |
|---|---|
| ADC Resolution | 10 bits |
| Speed | 30 M samples/s |
| Gain Range | 0–36 dB, with 0.09 dB steps |
| Linearity (full channel) | +/− 0.6 LSB DNL, +/− 2 LSB INL |
| SNR (Channel at 0 dB) | 71 dB |
| Supply Voltage | 2.7 V–3.3 V |
| Total Power Consumption | 150 mW at 3 V |
| Technology and die area | 0.6 u CMOS, 10.1 mm$^2$ |

Figure 9:
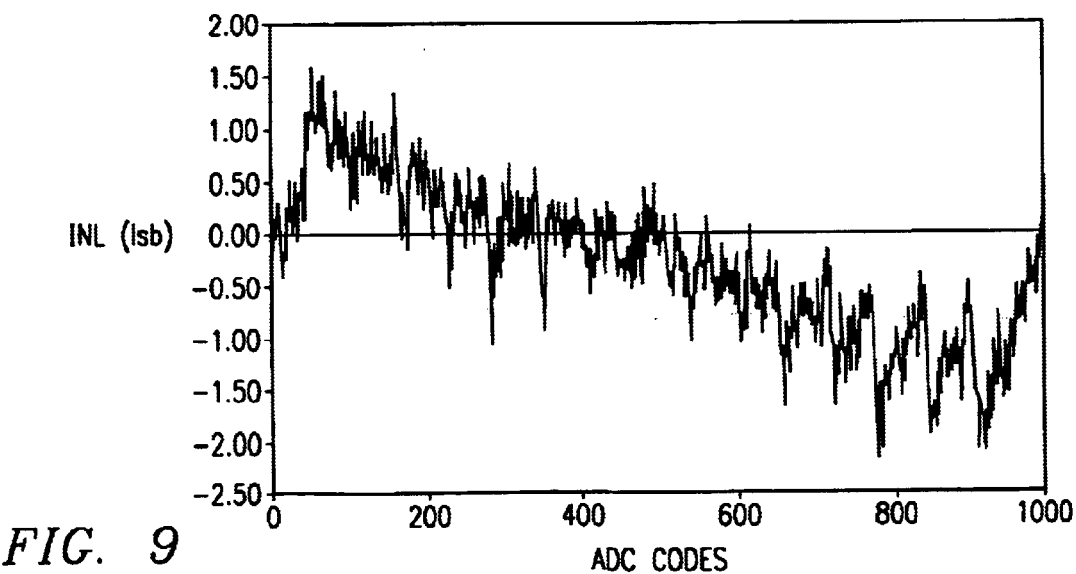
FIG. 9 is a diagram that illustrates the full channel integral non-linearity (INL) for the image apparatus in accordance with the present invention.
Figure 10:
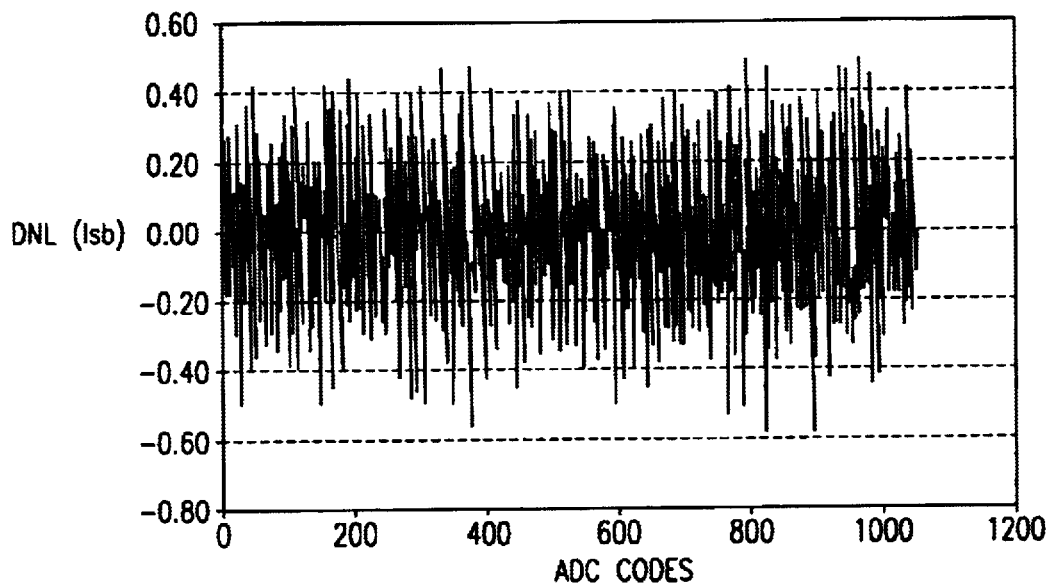
FIG. 10 is a diagram that shows the full channel differential non-linearity (DNL) for the image apparatus in accordance with the present invention.
Figure 11:
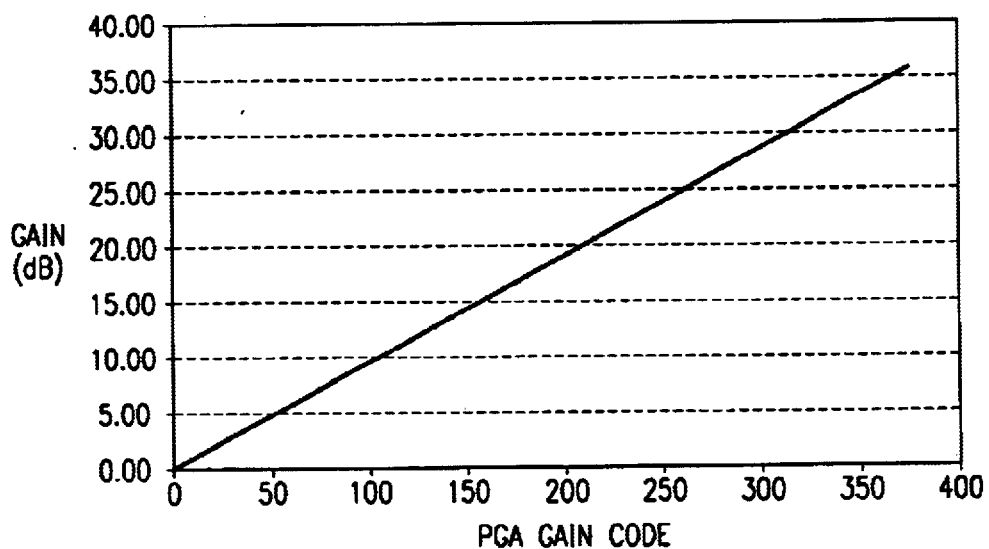
FIG. 11 is a diagram which displays the measured gain versus the digital gain code.

FIGS. 9 and 10 show the measured full channel INL and DNL. DNL is defined as the difference between the "width" of each signal's analog input range and the ideal range. INL is the deviation of the analog front-end's actual transfer function from an ideal transfer function. FIG. 11 shows the measured gain v. digital gain code. It can be seen that gain control is very linear in exponential scale, hence approximation in Equation [1] is verified.

Figure 5:
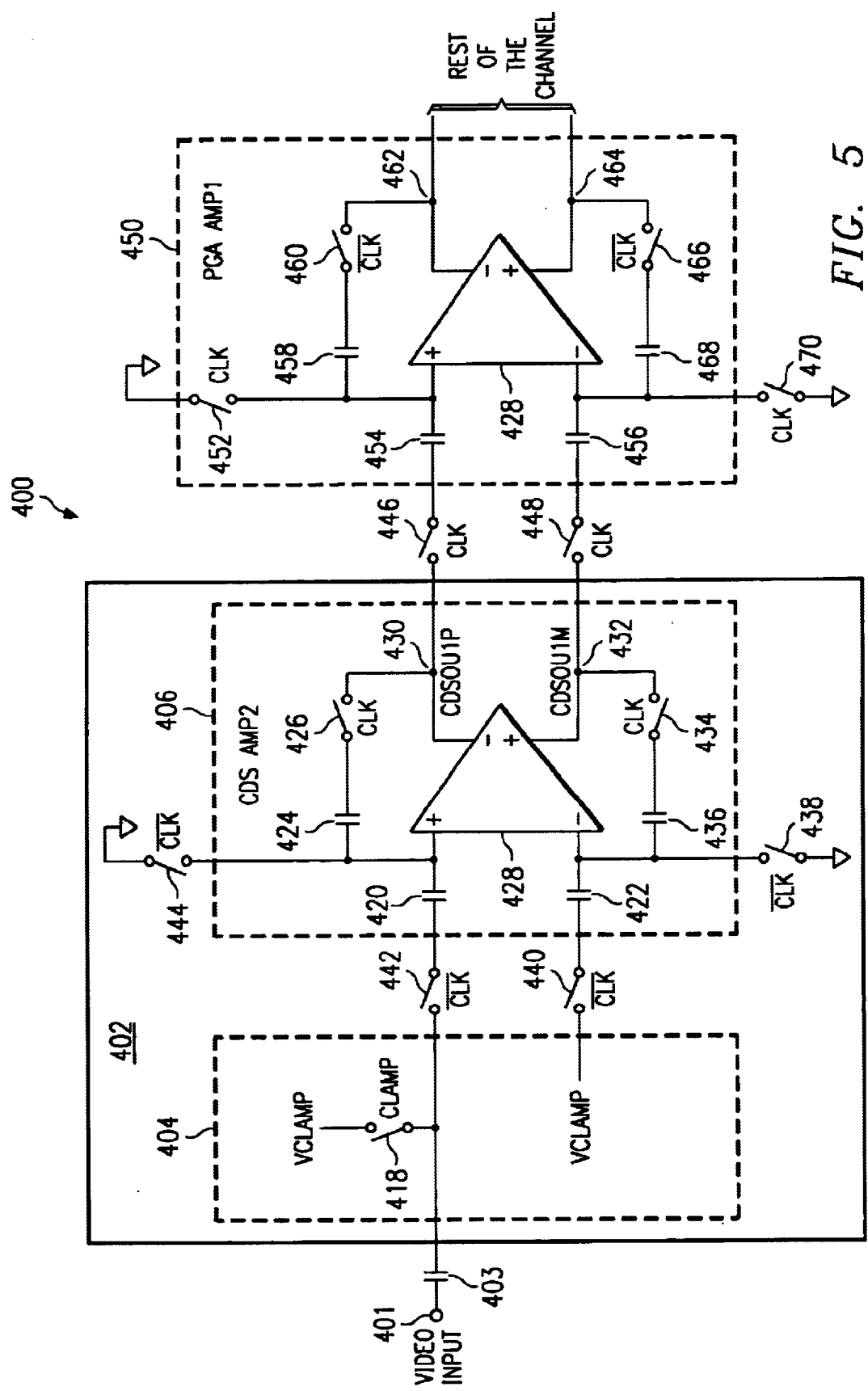
FIG. 5 displays an image apparatus operable in a video mode in accordance with the present invention.
Figure 7:
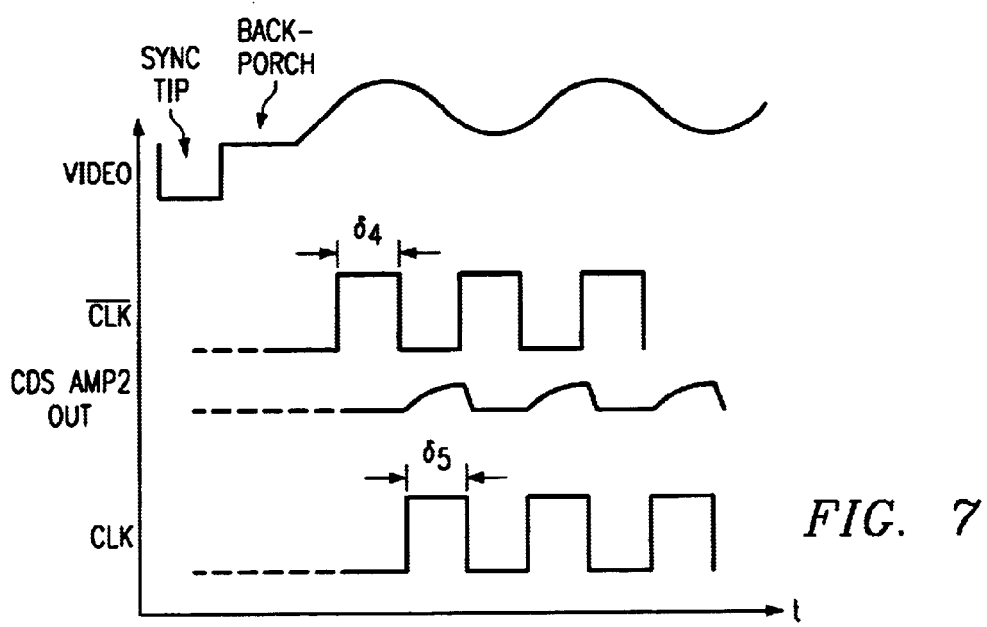
FIG. 7 is a timing diagram for the signals of the image apparatus operable in video mode in accordance with the present invention.
Figure 8:
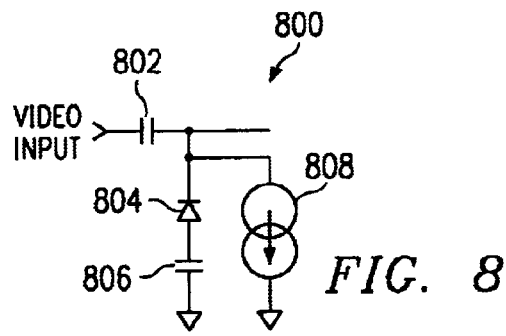
FIG. 8 is an auto-clamp block diagram.

During video mode, only CDS-AMP2 406 is used to sample the input signal. Note also that CDS 402 and the rest of the channel used the same clock signal (CLK). Different pins are used for the video and CCD input. The multiplexer for the CCD and video inputs is implemented by the CDS-AMP2 406 sampling switches as shown in FIG. 5. As shown in FIG. 7, during interval $\delta_4$, the video signal input is sampled. This video signal is capacitively coupled to the input. Either auto-clamp or manual clamp can be used to establish the proper DC level 806. As shown in FIG. 8, the model for auto-clamp 800 is an ideal diode 804 with an intentional leakage current 808. The auto-clamp 800, however, will clamp to the most negative point of the video signal. If a negative spike at the video input causes incorrect clamping, the leakage current will bring the DC level down. The single-ended amplifier 404 is effectively bypassed and serves only to hold the reference level of the pixel during this video interval. During interval $\delta_5$, PGA 450 samples the output of the differential amplifier 406.

Although the clamp voltage is fixed, any DC offset can be corrected using the correction DACs, 228 and 230, that were used in optical black correction in CCD mode. These DACs, 228 and 230, also enable the programming of the minimum ADC 210 digital output to the back porch instead of the sync-tip. This way, the dynamic range for the video input can significantly be improved to $\frac{1}{5}^{th}$ or $\frac{1}{4}^{th}$ of the total range. However, the difference between the sync-tip and back porch needs to be sensed and digitized also for automatic gain calculation. This value can be sensed by using an intentional, fixed, analog offset during the sync-tip period. This analog offset may be implemented with the use of offset registers 222 and 224.

The advantages of the imaging processing apparatus includes but is not limited to an image processing circuit that may receive CCD and video inputs to be operable in a CCD mode and video mode. This circuit also has an improved dynamic range for image processing over other approaches. As such, this highly programmable design can be used both in discrete and continuous time systems and does not require any off-chip components. Thus, this design meets the goal of extracting as much analog dynamic range from the image sensor without adding any noise with subsequent circuitry.

The present invention finds application in a great many video systems including digital still cameras, digital video cameras, digital video processing systems, CCD signal processors, and CMOS imagers, in a variety of industrial, medical, and military sensor and imaging applications.

The present invention provides significant advantages over conventional architectures including digital programmability, fine resolution, and compatibility for both continuous time and discrete time programmable gain amplifiers.

The reader's attention is directed to all papers and documents which are filed concurrently with this specification and which are open to public inspection with this specification, and the contents of all such papers and documents are incorporated herein by reference.

All the features disclosed in this specification (including any accompany claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An image processing apparatus having offset and optical black correction coupled to receive an image input signal from a charge coupled device and a video input signal from a video device, comprising:
   a sampling circuit for sampling the CCD and video input signals at a predetermined reference voltage, the sampling circuit comprises
      a correlated double sampler comprising,
         a single-ended amplifier, and
         a differential amplifier coupled to the single-ended amplifier, wherein the single-ended amplifier is operable in a CCD mode to pass the image input signal and the single-ended amplifier is bypassed in a video mode such that the video input signal is sampled by the differential amplifier solely, and
      a programmable gain amplifier coupled to receive the sampled signal from the correlated double sampler to amplify the sampled signal;
   an analog-to-digital converter coupled to the sampling circuit for converting the sampled signal into a digital signal;
   a digital correction circuit for correcting the optical black level by feeding back the difference between the sampled signal and an optical black reference level such that the difference is added and subtracted from the analog image and video.input signal.

2. The apparatus having offset and optical black correction circuit as recited in claim 1, wherein the programmable gain amplifier has an exponential gain characteristic of function:

$$G(x)=1+2x/(1-x).$$

3. The apparatus having offset and optical black correction circuit as recited in claim 2, wherein the sampling circuit further comprises a register coupled to the programmable gain amplifier to customize the value of amplification.

4. The apparatus having offset and optical black correction circuit as recited in claim 1, wherein the digital averager further comprises a first filter to remove hot and cold pixels from the image signal.

5. The apparatus having offset and optical black correction circuit as recited in claim 1, wherein the line noise filter applies the function:

$$Y(n)=\alpha^*X(n)+(1-a)^*Y(n-1)$$

to the image signal, where $Y(n)$ is the new digital-to-analog converter value; $X(n)$ is the difference between the desired value and actual optical black level at the analog-to-digital converter output if correction digital-to-analog converter is zero, $Y(n-1)$ is the previous digital-to-analog converter value, and $\alpha$ is the user programmable weight.

6. The apparatus having offset and optical black correction circuit as recited in claim 1, wherein the correction circuit comprises a first digital-to-analog converter coupled to the adder to apply the difference to the analog image signal.

7. The apparatus having offset and optical black correction circuit as recited in claim 6, wherein the correction circuit further comprises a second digital-to-analog converter coupled to the sampling circuit to apply the difference to the amplified analog image signal such that the first digital-to-analog converter being operable in a coarse mode wherein a coarse adjustment is made to the analog image signal prior to the second digital-to-analog converter being operable in a fine mode wherein a fine adjustment is made to the amplified analog image signal.

8. The apparatus having offset and optical black correction circuit as recited in claim 7, wherein the correction circuit further comprises a first and a second offset register coupled to the first and second digital-to-analog converters to customize the offset value for the image signal.

9. An image processing method comprising the steps of:
   converting a signal of reflected light off of an object photoelectrically to obtain an image signal;
   generating a predetermined reference voltage;
   clamping the image signal to a predetermined reference voltage;
   amplifying signal with a single-ended amplifier followed by a plurality of differential amplifiers when in a CCD mode;
   amplifying signal with the plurality of differential amplifiers when in a video mode;
   filtering out hot and cold optical black pixels;
   detecting an optical black level of the clamped image signal;
   filtering out line noise;
   generating a difference between the optical black level detected with a predetermined optical black level;
   switching between a coarse mode and a fine mode to apply a coarse adjustment and a fine adjustment, respectively; and
   correcting the optical black level by feeding back the difference to the clamped image signal.

10. The method of claim 9, wherein the line noise filtering step applies the function:

$$Y(n)=\alpha^*X(n)+(1-a)^*Y(n-1)$$

to the image signal, where $Y(n)$ is the new digital-to-analog converter value; $X(n)$ is the difference between the desired value and actual optical black level at the analog-to-digital converter output if correction digital-to-analog converter is zero, $Y(n-1)$ is the previous digital-to-analog converter value, and $\alpha$ is the user programmable weight.

* * * * *